(12) United States Patent
Roelofs

(10) Patent No.: US 8,617,765 B2
(45) Date of Patent: Dec. 31, 2013

(54) CHEMICALLY STABILIZED IONOMERS CONTAINING INORGANIC FILLERS

(75) Inventor: Mark Gerrit Roelofs, Earleville, MD (US)

(73) Assignee: E I du Pont de Nemours and Company, Wilmington, DE (US)

( * ) Notice: Subject to any disclaimer, the term of this patent is extended or adjusted under 35 U.S.C. 154(b) by 976 days.

(21) Appl. No.: 12/158,098

(22) PCT Filed: Dec. 21, 2006

(86) PCT No.: PCT/US2006/049018
§ 371 (c)(1),
(2), (4) Date: Jun. 19, 2008

(87) PCT Pub. No.: WO2008/054420
PCT Pub. Date: May 8, 2008

(65) Prior Publication Data
US 2009/0246591 A1    Oct. 1, 2009

Related U.S. Application Data

(60) Provisional application No. 60/753,036, filed on Dec. 22, 2005.

(51) Int. Cl.
*H01M 8/10*  (2006.01)
*C08K 3/10*  (2006.01)
*C08L 27/12* (2006.01)

(52) U.S. Cl.
USPC .............. 429/494; 521/27; 521/31; 521/38; 524/413; 524/414; 524/430; 524/544; 526/243; 528/483

(58) Field of Classification Search
USPC ............... 524/413, 414, 544; 521/31, 38; 528/483; 429/494
See application file for complete search history.

(56) References Cited

U.S. PATENT DOCUMENTS

| | | | |
|---|---|---|---|
| 3,962,153 A * | 6/1976 | Gore | 521/79 |
| 4,743,658 A | 5/1988 | Imbalzano et al. | |
| 5,000,875 A | 3/1991 | Kolouch | |
| 5,919,583 A | 7/1999 | Grot et al. | |
| 7,173,067 B2 * | 2/2007 | Guerra | 521/31 |
| 2007/0105966 A1 * | 5/2007 | Guerra | 521/31 |

FOREIGN PATENT DOCUMENTS

| | | |
|---|---|---|
| EP | 1 243 601 A1 | 9/2002 |
| EP | 1 635 412 A1 | 3/2006 |
| GB | 1210794 A | 10/1970 |
| WO | 03/077340 A2 | 9/2003 |
| WO | 2005/060039 A1 | 6/2005 |
| WO | 2005/071779 A2 | 8/2005 |

* cited by examiner

*Primary Examiner* — Nicole M Buie-Hatcher

(57) ABSTRACT

Ionomeric polymers that are chemically stabilized and contain inorganic fillers are prepared, and show reduced degradation. The ionomers care useful in membranes and electrochemical cells.

16 Claims, No Drawings

CHEMICALLY STABILIZED IONOMERS CONTAINING INORGANIC FILLERS

This invention was made with government support under Contract No. DE-FC04-02AL67606 awarded by the U.S. Department of Energy. The government has certain rights in the invention.

FIELD OF INVENTION

This invention relates to ionomeric polymers, and methods of preparation, useful in electrochemical and fuel cells.

BACKGROUND

Electrochemical cells generally include an anode electrode and a cathode electrode separated by an electrolyte, where a proton exchange membrane (hereafter "PEM") is used as the electrolyte. A metal catalyst and electrolyte mixture is generally used to form the anode and cathode electrodes. A well-known use of electrochemical cells is in a stack for a fuel cell (a cell that converts fuel and oxidants to electrical energy). In such a cell, a reactant or reducing fluid such as hydrogen is supplied to the anode, and an oxidant such as oxygen or air is supplied to the cathode. The hydrogen electrochemically reacts at a surface of the anode to produce hydrogen ions and electrons. The electrons are conducted to an external load circuit and then returned to the cathode, while hydrogen ions transfer through the electrolyte to the cathode, where they react with the oxidant and electrons to produce water and release thermal energy. An individual fuel cell consists of a number of functional components aligned in layers as follows: conductive plate/gas diffusion backing/anode electrode/membrane/cathode electrode/gas diffusion backing/conductive plate. Another well know use of PEM cells is in electrolysis of water to form hydrogen at the cathode and oxygen at the anode.

Long term stability of the proton exchange membrane is critically important for several industrial applications, such as fuels cells. For example, the lifetime goal for stationary fuel cell applications is 40,000 hours of operation. Typical membranes found in use throughout the art will degrade over time through decomposition of the fluoropolymer, accompanied by emission of fluoride ions and membrane thinning, thereby compromising membrane viability and performance. While not wishing to be bound by theory, it is believed that this degradation is a result of the reaction of the membrane fluoropolymer with radicals arising from the decomposition of hydrogen peroxide ($H_2O_2$), which are generated during fuel cell operation.

Thus, it is desirable to develop a process for reducing or preventing proton exchange membrane degradation due to the membrane's interaction with hydrogen peroxide radicals, thereby sustaining its level of performance while remaining stable and viable for longer periods of time, wherein as a result, fuel cell costs can be reduced.

G.B. Patent No. 1,210,794 discloses that it is possible to increase the stability of fluoropolymers by reacting the unstable end groups and other unstable groups with fluorine radicals to form more chemically stable groups.

Several references have shown that incorporating inorganic fillers into fluoropolymers can improve many properties (Alberti et al., Solid State Ionics, 2001, 145: 249-255; U.S. Pat. No. 5,919,583).

There is still a need to further improve the stability of fluoropolymer membranes by a greater degree than has been achieved by existing treatment.

SUMMARY OF THE INVENTION

The invention is directed to a chemically stabilized, fluorinated ionomer, wherein the ionomer has inorganic filler incorporated within, and wherein the ionomer has been fluorinated by subjecting it to a fluorinating agent until it contains less than 200 unstable groups per 1,000,000 carbon atoms, and membranes thereof.

The invention is also directed to a membrane comprising a porous support having interconnecting pores, a chemically stabilized fluorinated ionomer, and an inorganic filler, wherein: the inorganic filler is from the group of metal oxides, metal hydroxides, metal phosphates, and mixtures thereof; the ionomer has been chemically stabilized by subjecting it to a fluorinating agent until it contains less than 200 unstable groups per 1,000,000 carbon atoms; and the inorganic filler is distributed throughout the ionomer, and the ionomer and inorganic filler are distributed throughout the pores of the porous support.

The invention is also directed to electrodes and electrochemical cells comprising said ionomers and membranes.

DETAILED DESCRIPTION

Fuel cells are electrochemical devices that convert the chemical energy of a fuel, such as a hydrogen gas, and an oxidant into electrical energy. Typical fuel cells comprise an anode (a negatively charged electrode), and a cathode (a positively charged electrode) separated by an electrolyte that are formed as stacks or assemblages of membrane electrode assemblies. Fuel cells generally comprise a catalyst coated membrane (CCM) in combination with a gas diffusion backing (GDB) to form an unconsolidated membrane electrode assembly (MEA). The catalyst coated membrane comprises an ion exchange polymer membrane and catalyst layers or electrodes formed from an electrocatalyst coating composition.

Membranes made from the ionomer compositions described herein can be used in conjunction with fuel cells utilizing proton-exchange membranes (also known as "PEM"). Examples include hydrogen fuel cells, reformed-hydrogen fuel cells, direct methanol fuel cells or other organic/air fuel cells (e.g. those utilizing organic fuels of ethanol, propanol, dimethyl-or diethyl ethers, formic acid, carboxylic acid systems such as acetic acid, and the like).

The invention is directed to a ionomer, and membrane thereof, exhibiting increased stability, comprising a chemically stabilized fluorinated ionomer, wherein the membrane has inorganic filler dispersed within. The combination of the chemical stabilization with the presence of the inorganic filler provides a synergistic effect that decreases degradation of the membrane.

Ionomer

Following the practice of the art, as used herein the term "ionomer" is used to refer to a polymeric material having a pendant group with one or more ionic groups. An ionomer typically has cation exchange groups that can transport protons. The cation exchange groups are acids that can be selected from the group consisting of sulfonic, phosphonic, methide, sulfonimide (e.g., $—SO_2N(H)SO_2R$, where R is an optionally substituted hydrocarbyl group) and sulfonamide groups, and salts thereof. Typically, the ionomer has sulfonic acid groups. Various known ionomers can be used including ionomeric derivatives of trifluoroethylene, tetrafluoroethylene, alpha, beta, beta-trifluorostyrene, etc., in which cation exchange groups have been introduced. Suitable alpha, beta, beta-trifluorostyrene polymers are disclosed in U.S. Pat. No. 5,422,411.

"Fluorinated ionomer" means ionomers in which at least 30% of the total number of halogen and hydrogen atoms are fluorine atoms. A precursor to the fluorinated ionomer, either in the monomeric or polymeric form typically comprises a sulfonyl fluoride end-group, which when subject to hydrolysis under alkaline conditions, according to well-known methods in the art, is converted into a sulfonate salt and further acid exchanged to sulfonic acid. Alternately, the sulfonyl fluoride end group can be converted to other cation exchange groups such as sulfonimides.

Other fluorinated ionomer membranes known in the art that are suitable are those described in WO 0024709 and U.S. Pat. No. 6,025,092.

In one embodiment, the fluorinated ionomer is a highly fluorinated polymer. The term "highly fluorinated" means that at least 90% of the total number of halogen and hydrogen atoms are fluorine atoms. In another embodiment, the polymer is perfluorinated, which means 100% of the total number of halogen and hydrogen atoms on the backbone are fluorine atoms.

In another embodiment, the highly fluorinated ionomers contain perfluorinated ether side chains, wherein the side chains contain a pendant sulfonic acid or sulfonimide group. Examples of suitable precursors to these ionomers use copolymers of a first fluorinated vinyl monomer and a second fluorinated vinyl monomer having the sulfonyl fluoride group. Possible first monomers include tetrafluoroethylene (TFE), hexafluoropropylene, vinylidine fluoride, trifluoroethylene, chlorotrifluoroethylene, perfluoro(alkyl vinyl ether), and mixtures thereof. Possible second monomers include a variety of fluorinated vinyl ethers with a sulfonyl fluoride group. Well-known fluorinated ionomers of this type that are in widespread commercial use are Nafion® perfluoroionomers available from E. I. du Pont de Nemours and Company, Wilmington Del. One type of Nafion® is formed by copolymerizing tetrafluoroethylene (TFE) with perfluoro(3,6-dioxa-4-methyl-7-octenesulfonyl fluoride), as disclosed in U.S. Pat. No. 3,282,875. Other fluorinated ionomers are copolymers of TFE with perfluoro (3-oxa-4-pentene sulfonyl fluoride), as disclosed in U.S. Pat. Nos. 4,358,545 and 4,940,525, and copolymers of TFE with $CF_2=CFO(CF_2)_4SO_2F$, as disclosed in U.S. Patent Appn. 2004/0121210. All of these copolymers can be converted to the ionomeric form by hydrolysis, typically by exposure to an appropriate aqueous base, as disclosed in U.S. Pat. No. 3,282,875.

A fluorinated ionomer with a sulfonimide group suitable for use is described in B. H. Thomas, et al., Journal of Fluorine Chemistry (2004), 125(8), 1231-1240 and in U.S. Pat. No. 5,463,005.

Another embodiment includes highly fluorinated polymers with a highly fluorinated carbon backbone and a precursor side chain represented by the formula $-(O-CF_2CFR_f)_a-(O-CF_2)_c-(CFR'_f)_bSO_3M$ wherein $R_f$ and $R'_f$ are independently selected from F, Cl or a perfluorinated alkyl group having 1 to 10 carbon atoms, a=0 to 2, b=0 to 1, c=0 to 6, and M is hydrogen or one or more univalent cations. The polymer can also comprise a perfluorocarbon backbone and the side chain is represented by the formula $-O-CF_2CF(CF_3)-O-CF_2CF_2SO_3H$. Polymers of this type are disclosed in U.S. Pat. No. 3,282,875

The equivalent weight (EW) of the ionomer can be varied as desired for the particular application. For the purposes of this application, equivalent weight is defined to be the weight of the polymer in sulfonic acid form required to neutralize one equivalent of NaOH. In the case where the polymer comprises a perfluorocarbon backbone and the side chain is the salt of a sulfonic acid, the equivalent weight typically is 500-1500, and more typically 800-1200. The equivalent weight of the polymers disclosed in U.S. Pat. Nos. 4,358,545 and 4,940,525 is typically somewhat lower, e.g., 600-1300.

Chemical Stabilization

By "chemically stabilized" it is meant a polymer that has been chemically treated so that it contains a lower number of unstable groups, typically less than about 200 unstable groups per $10^6$ carbon atoms in the polymer, or more typically less than 70. Chemically stabilized fluorinated polymers are described in G.B. Pat. No. 1,210,794 and in U.S. Pat. No. 5,000,875, herein incorporated entirely by reference. By "chemically stabilizing" it is meant treating the polymer as described above.

Typically the chemical treatment consists of contact with a fluorinating agent. The fluorine radicals react with the unstable groups of the main polymer chain to convert them to a more stable form. Typically the unstable groups are located at the ends of polymer chains. This reaction is not limited to end groups, however, since polymers may contain unstable groups (such as unsaturated groups) within or pendant on the polymer chain, in which case the fluorine radicals also react to saturate or convert these unstable groups. The unstable groups which may be stabilized by the process may include $-CF_2CH_2OH$, $-CF_2H$, $-CONH_2$, acid halides such as $-COF$, carboxylate present as $-CO_2H$ or in the salt or ester forms thereof, vinyl end groups, such as disclosed in U.S. Pat. No. 3,085,083 or other unstable groups which are convertible to a more stable form. These unstable groups are detectable in the infrared spectrum of the polymer if the molecular weight of the polymer is not so high that the number of unstable groups present is too low to be detectable. Where the molecular weight is too high, the presence of unstable groups is suggested by analogy with the chemistry which leads to the formation of unstable groups in fluorocarbon polymers of lower molecular weight wherein infrared analysis is applicable. Conversion of the infrared-detectable unstable groups is indicated by a decrease in, or disappearance of (depending on the degree of completion of the reaction), of the absorption intensity arising from the particular unstable groups originally present.

Ionomers and membranes with low amounts of unstable groups, i.e. that have been chemically stabilized, are typically referred to as LC (low carboxyl). High carboxyl (HC) indicates a membrane that has not been chemically stabilized, as described above. Use of these terms does not limit the unstable groups to carboxyls only.

The unstable groups have a higher rate of thermal decomposition than the majority of groups in the polymer, or they degrade at a higher rate from chemical decomposition under oxidative or free-radical attack. A typical method of assessing chemical stability is to expose the polymer to the Fenton reagent, composed of hydrogen peroxide and an iron-containing catalyst.

The stable groups produced by the reaction of the unstable groups with fluorine radicals are chemically stable, i.e. non-reactive, groups, believed to be saturated fluorocarbon groups, especially $-CF_3$ or $-CF_2CF_3$. Evidence of this is the absence of absorption peaks (corresponding to new end groups) in the infrared spectrum of the fluorocarbon polymer after treatment by this process that are distinguishable from peaks from $-CF_3$ and $-CF_2CF_3$ groups. Further evidence of the chemical stability afforded by the end groups produced by reaction with fluorine radicals is the increased resistance to chemical degradation by Fenton reagent in the stabilized polymers.

The source of fluorine radicals may be any compound which generates these radicals under the conditions, mainly heating, employed. Such compounds are well-known in the art and by way of example include fluorine, $CoF_3$, $AgF_2$, $UF_6$, $OF_2$, $N_2F_2$, $CF_3OF$ and the interhalogen fluorides, e.g., $IF_5$; and $ClF_3$.

Procedures for fluorination to reduce the number of unstable groups are set forth in G.B. Patent No. 1,210,794 and U.S. Pat. No. 4,743,658, herein incorporated entirely by reference. Tests for determining the number of unstable groups are set forth in U.S. Pat. No. 4,743,658.

The fluorination may be carried out with a variety of fluorine radical generating compounds but typically the polymer is contacted with fluorine gas. Since reactions with fluorine are very exothermic, it is preferred to dilute the fluorine with an inert gas such as nitrogen. The reaction conditions are interrelated. No one condition is critical, but the relation between them is important. If higher temperatures are used, shorter reaction times can be used, and vice versa. Similarly, if higher pressures are used, reaction temperatures and times can be reduced. With this in mind, the level of fluorine in the fluorine/inert gas mixture may be about 1 to about 100 volume % but is typically about 10 to about 25 volume % because it is more hazardous to work with pure fluorine. The temperature may be about 150° C. to about 250° C., or about 200° C. to about 250° C., and the fluorination time may be about 4 to about 16 hours, or about 8 to about 12 hours. The polymer may be agitated to expose new surfaces continuously. The gas pressure during fluorination may range from about 1 atmosphere to about 10 atmospheres absolute but atmospheric pressure can be used. If a reactor is used at atmospheric pressure, it is convenient to pass the fluorine/inert gas mixture through the reactor continuously.

Another means of expressing the combination of fluorine concentration and reaction time for the fluorination step is to define the amount of fluorine added per pound of polymer. The range of applicable values is about 1.8 to about 5.1 grams of fluorine per kilogram of polymer, with the desired range being about 2.4 to about 3.3 grams per kilogram. These values include the amount of fluorine to bring the reactor from 0.1 atmosphere to 1 atmosphere pressure at the beginning of the reaction.

Polymer subjected to fluorination may be any form with appropriately high surface/volume ratio, such as powders, flake, pellets, cubes, fibers, beads, or thin films. For convenience, particle size or cross-section should not exceed 5 mm.

After exposure of the polymer to fluorination for the desired length of time, the polymer is subjected to a flow of inert gas, i.e., inert to the copolymer, such as nitrogen, until the level of extractable fluorides is 3 ppm by weight or less. Generally, in this sparging step, the reaction vessel is evacuated to 0.1 atmosphere before adding the inert sparge gas. Minimum time to complete sparging is defined by contacting, usually by bubbling, the effluent sparge gas with a starch/iodide solution or by passing it over starch/iodide paper. Lack of color development in the indicator indicates the absence of fluorine in the purge. Generally, 1-4 hours of sparging is adequate.

The fluorination and sparging conditions are such that after treatment, the polymer will typically contain less than 200 end groups of unstable end groups per $10^6$ carbon atoms in the polymer chain as measured using the IR end group analysis method described below. More typically, the polymer will contain less than 70 end groups per $10^6$ carbon atoms.

Inorganic Filler

A wide variety of inorganic fillers may be dispersed in the ionomer. Typically, the inorganic filler is a metal salt or complex, or mixture thereof. By "metal" it is meant transition metals, rare earth metals, and metalloids such as As, Sb, Se, Te, and Si. By "salt or complex" it is meant a compound in which at least one metal is in cationic form. The salt may typically include, but is not limited to, one or more of aluminate, antimonate, arsenate, benzoate, borate, bromate, bromide, carbonate, carboxylate, chlorate, chloride, chromate, cyanate, dicarboxylate, halide, polymolybdates, polytungstates, hydrogen phosphate, hydroxide, iodate, iodide, molybdate, nitrate, nitrite, oxalate, oxide, phosphate, polyphosphate, pyrophosphate, silicate, silane, sulfate, sulfide, sulfite, thiocyanate, thiosulfate, tungstate, and vanadate.

The inorganic filler may also be a coating on an inorganic particle, such as but not limited to metal oxides, phosphates, or hydroxides and hydrates thereof, including the class of metal oxide hydrates commonly known as zeolites.

In one embodiment the metal is a transition metal and the salt is an oxide, hydroxide, or phosphate, and hydrates and mixtures thereof. In another embodiment the metal is Zr, Hf, or Ti. Examples of ionically conductive inorganic fillers are heteropoly acids, for example phosphotungstic acid, and metal hydrogen phosphates such as zirconium hydrogen phosphate. The inorganic filler may be a zirconium phosphate such as $Zr(HPO_4)_2.nH_2O$, $Zr_3(PO_4)_4.nH_2O$, or a modified phosphate such as α- or γ-layered zirconium phosphate sulfoarylenephosphonates represented by the general formula $Zr(O_3POH)_{2-x}(O_3P-Ar)_{x-1}.nH_2O$, where 0<n≤8, 0<x≤2 and Ar is a sulfonated arylene group such as $-C_6H_4SO_3H$. Preparation of such modified phosphates are described in WO 03/077340(A2).

The inorganic fillers are typically commercially available, can be synthesized by known techniques, or can be prepared in situ. The solubility of the inorganic fillers varies widely. For use in accordance with the invention, an inorganic filler having suitably low solubility can be selected to match the intended application so that the inorganic filler does not leach out of the polymer in use at a rate which would detrimentally affect performance. The inorganic filler should be selected to be stable to the acidic environment provided by the ionomer and to the temperatures required in its application.

The amount of inorganic filler used in the ionomers as described herein can be in the range about 1 to about 40% by weight, or about 3 to about 20% by weight, based on the total weight of the ionomer after incorporation.

Incorporation of Inorganic Fillers into the Ionomer

The ionomers containing an inorganic filler can be produced by a variety of techniques. The inorganic filler may be melt blended with the ionomer or ionomer precursor using conventional techniques. The inorganic filler can be mixed with a solution/dispersion in a suitable solvent containing the ionomer precursor or the ionomer in ionic form. A solution/dispersion of the inorganic filler in a suitable solvent can also be used to impregnate the inorganic filler into the ionomer when it is in any solid form, such as pellets, fibrils, films or membranes.

Alternately, the inorganic filler can be dissolved or dispersed into the solvent containing a monomer, which is then polymerized to form the ionomer containing the filler dispersed within. For proper incorporation in the resulting polymer, the inorganic filler should be suitably soluble or sufficiently dispersed in the solvent, and should be sufficiently inert to the reagents and solvent such that it does not adversely affect the polymerization or product.

When the inorganic filler is mixed with a solution/dispersion in a suitable solvent of ionomer precursor or with the ionomer in ionic form, the resulting solution or dispersion can also be used to apply a coating to a support to form a membrane. The inorganic filler, or a precursor to it, may also be incorporated in a stabilized ionomer dispersion and mixed with catalyst to form an electrode comprising the stabilized ionomer, inorganic filler, and catalyst. Thermoplastic polymers, or polymers which can be in thermoplastic form, e.g., the sulfonyl fluoride form of perfluorinated sulfonic acid polymers, can be melt blended with the inorganic filler and a film can be extruded from the molten mixture. For perfluorinated sulfonic acid polymers, hydrolysis of the film to convert it to ionic form can be performed as has been discussed above although care may be required with some inorganic fillers to prevent removal or chemical alteration of the material during hydrolysis.

The ionomer can also be mixed with a solvent before or after combination with the inorganic filler. By mixing it is meant either in solution or dispersion form.

When the inorganic filler has sufficiently low water solubility, the inorganic filler can be precipitated or formed in situ in the ionomer, especially when it is in the form of a membrane or in an electrode. This method can be used either for membranes made by film extrusion, solution film casting, or those made by coating porous supports. In the case of an electrode, the presence of the catalyst may introduce additional constraints on the subsequent chemical treatments used to introduce the filler or transform a precursor to the final inorganic filler. Typically, for polymers such as the perfluorinated sulfonic acid polymer which are usually formed into a film in thermoplastic form, i.e., sulfonyl fluoride form, the membrane is hydrolyzed to its ionic (sulfonate) form before in situ precipitation due to the greater capability of the ionic form to absorb water. For fuel cell applications, the membrane will normally be converted from an alkali metal salt form to the acid (hydrogen ion) form which may be used for the in situ precipitation.

In situ precipitation can be accomplished by sequentially contacting the membrane with one or more solutions containing ions or other reactants which form the inorganic filler. Using this procedure, the inorganic filler precipitates in the polymer of the membrane. In one embodiment of the process, zirconium hydrogen phosphate $Zr(HPO_4)_2$ can be precipitated in a membrane of perfluorinated sulfonic acid polymer (preferably in acid form) by soaking the membrane in an aqueous solution of containing zirconium ions, e.g., 1-5 M zirconyl chloride, for a time and at a temperature sufficient to penetrate the membrane solution. Then, the membrane is soaked in an aqueous solution containing $(PO_4)^{3-}$ ions, e.g., 20 to 90 weight percent phosphoric acid, for a time and at a temperature sufficient to form zirconium hydrogen phosphate within the membrane. No special conditions are needed for carrying out the process and 2-20 hours at room temperature are suitable times for each of the soaking steps. It may be desirable to rinse the membrane in water after soaking in the zirconium solution to prevent a precipitation of filler on the surface of the membrane. $TiO_2$ can also be incorporated within the polymer of a membrane by in situ precipitation. Starting with a membrane, typically in acid (hydrogen ion) form, one process includes soaking the membrane in an alcohol solution of one or more titanium alkoxides of the formula $(RO)_4Ti$, where R in this formula is an alkyl group of one to four carbon atoms. The alkoxy groups may be linear groups, such as primary alkoxy groups (e.g., propoxy), or secondary alkoxy groups such as isopropoxy and the four groups per molecule may be the same or may be different. The alcohol solvent in the titanium alkoxide solution is an aliphatic alcohol of 1 to 4 carbon atoms, for example, methanol, ethanol, propanol and butanol. The soaking is continued for a time and at a temperature sufficient to swell and expand the membrane. The temperatures can be in the range of about 20° C. to about 100° C., for a sufficient time such as about 1 to about 30 minutes. A temperature of about 75° C. for about 10 minutes has been found to be effective. After soaking, the surface of the membrane can be rinsed to wash off surface titanium alkoxide. Alcohols, such as those used for the making the titanium alkoxide solution of the soaking step, are useful for rinsing. The next step of the process, is to hydrolyze the titanium alkoxide in the membrane with water. The step of hydrolyzing the titanium alkoxide in place in the membrane is carried out easily. No special conditions are required due to the ease of hydrolysis. Contact times of 10 minutes at room temperature have been found to be suitable.

In one form of the ionomer, and membranes thereof, and electrode assemblies and fuel cells comprising them, the polymer in the bulk of the ionomer and membrane is substantially free of metal catalysts. Metal catalysts such as platinum, gold, palladium, etc. have been incorporated into known membranes together with metal oxides such as $SiO_2$ and $TiO_2$ for the purposes of internal humidification of the membrane when used in hydrogen-oxygen fuel cells. As is explained hereinafter, metal catalysts are typically present in membrane and electrode assemblies in which electrodes are formed on the surface of the membrane. By the bulk of the polymer being substantially free of metal catalysts is meant that the polymer in the interior of the membrane is substantially free of metal catalysts. There is no intent by this language, however, to exclude catalysts being present at or on the surface of the membrane.

When the ionomer described herein is used as the binder polymer for an electrocatalyst of an electrochemical cell, as discussed hereinafter, the inorganic filler can be incorporated into the ionomer in one of a variety of methods. One method is to incorporate the filler into the electrode ink formulation which may be directly applied to a membrane to make a catalyst coated membrane of an MEA or may be used to form a "decal" which is subsequently applied to the membrane. A typical method for the incorporation of suitable inorganic fillers in the binder polymer of an MEA is by in situ precipitation. Using the same process steps as are used to incorporate fillers into the ionomer as described previously, an inorganic filler can be incorporated in the binder polymer of the electrode of an MEA and, at the same time, incorporated in the polymer of the membrane. Similarly, an in situ precipitation process can be used to incorporate inorganic filler in a binder polymer of an electrode "decal". Regardless of the method used to incorporate the inorganic filler in the electrode layer, care should be taken in adjusting the loading and distribution of the filler so that porosity of the electrode layer is maintained at the desired level.

Membrane

The ionomers described herein can be formed into membranes using any conventional method.

In the manufacture of membranes using an ionomer which has a highly fluorinated polymer backbone and sulfonate ion exchange groups, membranes are typically formed from the ionomer in its sulfonyl fluoride form since it is thermoplastic in this form and conventional techniques for making films from thermoplastic polymer can be used. Alternately, the ionomer may be in another thermoplastic form such as by having —$SO_3X$ groups where X is a quaternary amine. Solution film casting techniques using suitable solvents for the particular polymer can also be used if desired.

A film of the ionomer in sulfonyl fluoride form can be converted to the sulfonate form (sometimes referred to as ionic form) by hydrolysis using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6-20% of an alkali metal hydroxide and 5-40% polar organic solvent such as dimethyl sulfoxide with a contact time of at least 5 minutes at 50-100° C. followed by rinsing for 10 minutes. After hydrolyzing, the membrane can be converted if desired to another ionic form by contacting the membrane in a bath containing a 1% salt solution containing the desired cation or, to the acid form, by contacting with an acid and rinsing. For fuel cell use, the membrane is usually in the sulfonic acid form.

Alternately the hydrolysis and/or the acidification step may be performed on the ionomer before the membrane is formed.

If desired, the membrane can be a laminate of two polymers such as two highly fluorinated polymers having different ion exchange capacities. Such films can be made by laminating two membranes or co-extruding a film with the two polymer layers. Alternatively, one or both of the laminate components can be cast from solution or dispersion. When the membrane is a laminate, the chemical identities of the monomer units in the additional ion exchange polymer can independently be the same as or different from the identities of the analogous monomer units of the first ionomer.

The thickness of the membrane can be varied as desired for a particular electrochemical cell application. Typically, the thickness of the membrane is less than about 350 μm, more typically in the range of about 25 μm to about 175 μm.

The membrane may optionally include a porous support for the purposes of improving mechanical properties, for decreasing cost and/or other reasons. The porous support of the membrane may be made from a wide range of components, such as but not including a hydrocarbon such as a polyolefin, e.g., polyethylene, polypropylene, polybutylene, copolymers of those materials, and the like. Perhalogenated polymers such as polychlorotrifluoroethylene may also be used.

For resistance to thermal and chemical degradation, the support preferably is made of a highly fluorinated polymer, most preferably a perfluorinated polymer. For example, the polymer for the porous support can be a microporous film of polytetrafluoroethylene (PTFE) or a copolymer of tetrafluoroethylene with $CF_2=CFC_nF_{2n+1}$ (n=1 to 5) or $(CF_2=CFO-(CF_2C(CF_3)FO)_mC_nF_{2n+1}$ (m=0 to 15, n=1 to 15). The porous support can be in expanded or fibrilar form.

Microporous PTFE films and sheeting are known which are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids.

Alternatively, the porous support may be a fabric made from fibers of the polymers discussed above woven using various weaves such as the plain weave, basket weave, leno weave, or others.

A film can be made using the porous support by coating the ionomer on the support so that the coating is on the outside surfaces as well as being distributed through the internal pores of the support. This may be accomplished by impregnating the porous support solution with the ionomer in sulfonyl fluoride form using a solvent which is not harmful to the polymer of the support under the impregnation conditions and which can form a thin, even coating of the ionomer on the support. The ionomer may be coated into the porous support from a solution or dispersion of the ionomer in ionic form. Alternately or in addition to impregnation, thin films of the ionomer can be laminated to one or both sides of the porous support. For a film made by impregnation of a porous support, laminating a thin film is advantageous for preventing bulk flow through the membrane which can occur if large pores remain in the film.

Membrane and Electrode Assemblies and Electrochemical Cell

Membranes containing the ionomers described herein can be used in many different types of electrochemical cells. One suitable embodiment is a fuel cell. Fuel cells are well known in the art and one suitable embodiment is described below. An ionomeric polymer electrolyte membrane is used to form a membrane electrode assembly (MEA) by combining it with a catalyst layer, comprising a catalyst, e.g. platinum, unsupported or supported on carbon particles, a binder such as Nafion®, and a gas diffusion backing. The ionomeric polymer electrolyte membrane with a catalyst layer forms a catalyst coated membrane (CCM). The gas diffusion backing may comprise carbon paper which may be treated with a fluoropolymer and/or coated with a gas diffusion layer comprising carbon particles and a polymeric binder to form a membrane electrode assembly (MEA). The fuel cell is further provided with an inlet for fuel, such as liquid or gaseous alcohols, e.g. methanol and ethanol; or ethers such as diethyl ether, etc., an anode outlet, a cathode gas inlet, a cathode gas outlet, aluminum end blocks, tied together with tie rods (not shown), a gasket for sealing, an electrically insulating layer, and graphite current collector blocks with flow fields for gas distribution, and gold plated current collectors.

The fuel cell utilizes a fuel source that may be in the liquid or gaseous phase, and may comprise an alcohol or ether. Typically a methanol/water solution is supplied to the anode compartment and air or oxygen supplied to the cathode compartment. The ionomeric polymer electrolyte membrane serves as an electrolyte for proton exchange and separates the anode compartment from the cathode compartment. A porous anode current collector, and a porous cathode current collector are provided to conduct current from the cell. A catalyst layer that functions as the cathode is in contact with and between the cathode-facing surface of the membrane and the cathode current collector. A catalyst layer that functions as the anode is disposed between and is in contact with the anode-facing surface of the membrane and anode current collector. The cathode current collector is electrically connected to a positive terminal and the anode current collector is electrically connected to a negative terminal.

The catalyst layers may be made from well-known electrically conductive, catalytically active particles or materials and may be made by methods well known in the art. The catalyst layer may be formed as a film of a polymer that serves as a binder for the catalyst particles. The binder polymer can be a hydrophobic polymer, a hydrophilic polymer or a mixture of such polymers. The binder polymer is typically an ionomer and can be the same ionomer as in the membrane.

For example, in a catalyst layer using a perfluorinated sulfonic acid polymer membrane and a platinum catalyst, the binder polymer can also be perfluorinated sulfonic acid polymer and the catalyst can be a platinum catalyst supported on carbon particles. In the catalyst layers, the particles are typically dispersed uniformly in the polymer to assure that a uniform and controlled depth of the catalyst is maintained, preferably at a high volume density. It is typical that the particles be in contact with adjacent particles to form a low resistance conductive path through catalyst layer. The connectivity of the catalyst particles provides the pathway for electronic conduction and the network formed by the binder ionomer provides the pathway for proton conduction.

The ionomer described herein is also suitable as a polymeric binder for use in the electrocatalyst.

The catalyst layers formed on the membrane can be made porous so that they are readily permeable to the gases/liquids that are consumed and produced in cell. In such case, the average pore diameter is preferably in the range of about 0.01 to about 50 μm, most preferably about 0.1 to about 30 μm. The porosity is generally in a range of about 10 to about 99%, preferably about 10 to about 60%.

The catalyst layers are preferably formed using an "ink", i.e., a solution of the binder polymer and the catalyst particles, which is used to apply a coating to the membrane. The binder polymer may be in the ionomeric (proton) form or in the sulfonyl fluoride (precursor) form. When the binder comprises the ionomer described herein, the inorganic filler, or a precursor to it, may be introduced into the ink formulation. When the binder polymer is in the proton form, the preferred solvent is a mixture of water and alcohol. When the binder polymer is in the precursor form, the preferred solvent is a perfluorinated solvent (such as FC-40 made by 3M).

The viscosity of the ink (when the binder is in the proton form) is preferably controlled in a range of 1 to 102 poises especially about 102 poises before printing. The viscosity may be controlled by:

(i) particle size selection, (ii) the composition of the catalytically active particles and binder, (iii) adjusting the water content (if present), or (iv) preferably by incorporating a viscosity regulating agent such as carboxymethyl cellulose, methyl cellulose, hydroxyethyl cellulose, and cellulose and polyethylenegylcol, polyvinyl alcohol, polyvinyl pyrrolidone, sodium polyacrylate and polymethyl vinyl ether.

The area of the membrane to be coated with the ink may be the entire area or only a select portion of the surface of the membrane. The catalyst ink may be deposited upon the surface of the membrane by any suitable technique including spreading it with a knife or blade, brushing, pouring, metering bars, spraying and the like. The catalyst layer may also be applied by decal transfer, screen printing, pad printing or by application from a printing plate, such as a flexographic printing plate.

If desired, the coatings are built up to the thickness desired by repetitive application. The desired loading of catalyst upon the membrane can be predetermined, and the specific amount of catalyst material can be deposited upon the surface of the membrane so that no excess catalyst is applied. The catalyst particles are preferably deposited upon the surface of a membrane in a range from about 0.2 mg/cm$^2$ to about 20 mg/cm$^2$.

Typically a screen printing process is used for applying the catalyst layers to the membrane with a screen having a mesh number of about 10 to about 2400, more typically a mesh number of about 50 to about 1000, and a thickness in the range of about 1 to about 500 micrometers. The mesh and the thickness of the screen, and viscosity of the ink are selected to give electrode thickness ranging from about 1 micron to about 50 microns, more particularly about 5 microns to about 15 microns. The screen printing process can be repeated as needed to apply the desired thickness. Two to four passes, usually three passes, have been observed to produce the optimum performance. After each application of the ink, the solvent is preferably removed by warming the electrode layer to about 50° C. to about 140° C., preferably about 75° C. A screen mask is used for forming an electrode layer having a desired size and configuration on the surface of the ion exchange membrane. The configuration is preferably a printed pattern matching the configuration of the electrode. The substances for the screen and the screen mask can be any materials having satisfactory strength such as stainless steel, poly(ethylene terephthalate) and nylon for the screen and epoxy resins for the screen mask.

After forming the catalyst coating, it is preferable to fix the ink on the surface of the membrane so that a strongly bonded structure of the electrode layer and the cation exchange membrane can be obtained. The ink may be fixed upon the surface of the membrane by any one or a combination of pressure, heat, adhesive, binder, solvent, electrostatic, and the like. Typically the ink is fixed upon the surface of the membrane by using pressure, heat or a combination of pressure and heat. The electrode layer is preferably pressed onto the surface of the membrane at about 100° C. to about 300° C., most typically about 150° C. to about 280° C., under a pressure of about 510 to about 51,000 kPa (about 5 to about 500 ATM), most typically about 1,015 to about 10,500 kPa (about 10 to about 100 ATM).

An alternative to applying the catalyst layer directly onto the membrane is the so-called "decal" process. In this process, the catalyst ink is coated, painted, sprayed or screen printed onto a substrate and the solvent is removed. The resulting "decal" is then subsequently transferred from the substrate to the membrane surface and bonded, typically by the application of heat and pressure.

When the binder polymer in the ink is in the precursor (sulfonyl fluoride) form, the catalyst coating after it is affixed to the membrane, either by direct coating or by decal transfer, is subjected to a chemical treatment (hydrolysis & acid exchange) where the binder is converted to the proton (or acid) form.

An alternative method to making the MEA begins by fabricating a gas diffusion electrode (GDE), which includes the catalyst on the GDB, and then contacting the GDE with a membrane, or fabricating a membrane on the surface of the GDE. GDE's are typically fabricated by coating a carbon cloth or paper GDB with hydrophobic PTFE and then forming a microporous layer of carbon black and PTFE on the active surface of the membrane. This is followed by preparing an ink of catalyst particles, often Pt on carbon, suspended in a dispersion of the ionomer, and coating the catalyst ink onto the surface of the microporous layer. The microporous layer provides an electrically-conductive and gas-permeable layer which also serves to fill in the larger pores of the GDB and provide a flatter surface on which to deposit the active catalyst layer, keeping a larger fraction of the catalyst particles in good ionic contact with the membrane. GDE fabrication is described in U.S. Pat. No. 6,017,650. An alternate method of introducing the catalyst uses vacuum-deposition processes as described in A. F. Gullá, et al. Electrochemical and Solid-State Letters, 8, A504 (2005). The GDE(s) are then brought in contact with a membrane to make the final MEA, or the membrane may be fabricated on the surface of one of the GDE's, and the second GDE then contacted to the remaining free membrane surface. The surfaces of the GDE's may be further coated with ionomer dispersion and hot pressed to a membrane to fabricate the MEA.

In WO 2004/102714 and A. LaConti, et. al, (*Mechanisms of Membrane Degradation*, in *Handbook of Fuel Cells, Fundamentals, Technology and Applications*, W. Vielstich, A. Lamm, and H. Gasteiger, Editors, Vol. 3, 2003, John Wiley and Sons. p. 647-662,) it was shown that treatment of a membrane with Fenton's reagent is an accelerated and reliable test of chemical stability and tolerance to degradation.

The membranes are advantageously employed in MEA's for electrochemical cells, particularly fuel cells employing direct feed organic fuels such as methanol. They are also suitable for use in cells for the electrolysis of water to form hydrogen and oxygen. In tests to measure decomposition of fluorinated polymers, chemically stabilized membranes with inorganic fillers incorporated therein show unexpected improved results.

Methods

IR End Group Analysis

A general method for end group analysis is given below. Thin films (0.25-0.30 mm) are molded at 350° C. using a heated platen press. The films are scanned on an infrared spectrometer. Similarly, a film of a reference material known to have none of the end groups to be analyzed is molded and scanned. The reference absorbance spectrum is subtracted from the sample absorbance, using the interactive subtraction mode of the software. The —$CF_2$ overtone band at 4.25 micrometers is used to compensate for thickness differences between sample and reference during this interactive subtraction. The difference spectrum, in two ranges—5.13 to 5.88 micrometers (1950 to 1700 wavenumbers) and 2.70 to 3.45 micrometers (3700 to 2900 wavenumbers)—represents the absorbances due to reactive end groups.

Of primary interest to degradation are the end groups containing carbonyl end group (which includes —COF, and the carbinol end group, which are easily oxidized to produce HF and an acid fluoride end group. Calibration factors to allow calculation of end groups per million carbon atoms are determined from the absorbance of model compounds. The table below presents wavelengths and factors for determining end groups via the equation: ends/$10^6$ carbons=absorbance×CF/film thickness in mm

| ENDGROUP | WAVELENGTH | CALIBRATION FACTOR (CF) |
|---|---|---|
| —COF | 5.31 micrometers | 440 |
| —$CH_2OH$ | 2.75 micrometers | 2300 |
| —$CONH_2$ | 2.91 micrometers | 460 |

If the ionomer is present in ionic form, particularly acid form, more water is absorbed in the ionomer than if it were in the more hydrophobic sulfonyl fluoride precursor form. This water gives rise to an IR absorption peak near 1640 $cm^{-1}$ which interferes with the determination of carbonyl group absorption by IR. This problem may be mitigated by ion exchanging the ionomer with cesium ions, e.g. to —$CF_2SO_3Cs$ form which binds water less tightly than the acid form. The Cs-form ionomer is then dried under vacuum at 110 to 120° C., at which point the 1686 $cm^{-1}$ absorption of carboxylate groups may be resolved.

EXAMPLES

Example 1

Low carboxyl (LC) Membrane preparation: Nafion® resin of 1050 EW was synthesized as described in U.S. Pat. No. 3,282,875 and fluorinated to make LC resin using the process of Great Britain Patent No. 1,210,794. In the following, all references to water used deionized water. The LC resin was hydrolyzed to the potassium salt ionomer form, ion-exchanged to acid form, and dispersed in an alcohol/water mixture using the method of U.S. Pat. No. 4,433,082. The dispersion was cast and the liquids evaporated with heating to yield a 35 mm thick membrane. The membrane was dried at 150° C., further dried at 120° C. in a vacuum oven, and weighed.

ZrP incorporation: The membrane was mounted in a plastic frame to minimize further handling. The membrane was purified and swollen by boiling in 1% hydrogen peroxide for 5 min. The membrane was soaked in excess solution containing 1 M $ZrOCl_2$ and 1 M HCl at 22° C. for 15 min, and then soaked in excess 53% phosphoric acid at 22° C. for 15 min. The membrane was rinsed with water then heated in a convection oven at 120° C. for 1 hr. The membrane was then soaked in 53% phosphoric acid at 80° C. for 30 min, followed by boiling three times in water for 15 min. each time with changing to fresh water after each 15 min. period. The membrane was dried in a convection oven at 120° C. for 15 min., removed from the frame and weighed. The resulting LC/ZrP membrane had increased in weight by 11% compared to the starting membrane.

Fenton Test: To a 30 mm dia×200 mm test tube was added a ~0.6 g piece of the LC/ZrP membrane. The membrane was further dried in a vacuum oven at 90° C. for 1 hr and reweighed to give a dry weight. A solution of 50 ml of 30% hydrogen peroxide and 0.0029 g of iron sulfate ($FeSO_4.7H_2O$, 20 ppm) was added to the tube. A stir bar was placed on top to keep the membrane immersed in solution. The membrane was placed in a test tube rack and slowly immersed in a heated water bath at 85° C. for 18 hours. The membrane was removed and allowed to cool for 30 min. The liquid was removed from the test tube and placed in a tared 400 ml beaker. The tube and membrane were washed with water to remove all fluoride, and all the rinses were placed in the beaker. Two drops of phenolphthalein were added to the beaker and then 0.1N NaOH was added to the solution until the solution turned pink. The beaker was weighed and 10 ml was removed and placed into a 25 ml volumetric flask. 10 ml of buffer solution B was then added to the flask, then filled to the line with water. (Buffer solution B was made by dissolving 5 moles sodium chloride, 4 moles sodium acetate trihydrate, and 15.8 ml of glacial acetic acid to make 1 liter of solution.) The parts per million of fluoride was determined from a parts per million vs. mV calibration curve. The 18 hr treatment and fluoride ion measurement was repeated two more times, for a total of three cycles. Measuring fluoride generation in the third cycle identifies membranes which are initially stable, but whose degradation rate increases after multiple exposures.

Example 2

The LC-membrane was prepared as in Example 1. Zirconium hydrogen phosphate was incorporated in the membrane by a process similar to Example 1, with the following changes. The initial purification/swelling was boiling in 1% hydrogen peroxide for 15 min., instead of 5 min in Example 1. The ZrP uptake was 12% in this case. The sample was tested in the Fenton test as in Example 1.

Comparative Examples 3-6

Nafion® resin was prepared as in Example 1. The fluorination step was omitted, giving a high-carboxyl resin. Hydrolysis, dispersion, and membrane casting were done as in Example 1, except the drying of the membrane in a vacuum oven at 120° C. was omitted. Comp. Ex. 3 had no ZrP incorporation, while Comp. Ex.'s 3 and 5 underwent a ZrP incorporation similar to that of Ex 1, with the following differences: the zirconium solution was 2 M conc of ZrOCl$_2$ and had no added HCl, and the ZrP uptake was 18% for Comp. Ex. 3 and 17% for Comp. Ex. 5. Comp. Ex.'s 4 and 6 underwent no ZrP incorporation process.

Comparative Examples 7 & 8

The Nafion® resin was prepared as in Example 1, but the fluorination step was eliminated. Membrane preparation was as in Example 1, except the membrane thickness was 31 mm. For Comp. Ex. 7, ZrP was incorporated by soaking in 2 M ZrOCl$_2$ at 90° C. for 15 min., then soaking in 53% phosphoric acid at 90° C. for 15 min. The membrane was rinsed with water and dried in a vacuum oven at 120° C. for 1 hr. The membrane was soaked in 14% nitric acid at 80° C. for 15 min., followed by boiling three times in water for 15 min. each time with changing to fresh water after each 15 min. period.

The membrane was dried in a vacuum oven at 120° C. for 15 min and then reweighed. ZrP incorporation was 15%. The membrane for Comp. Ex. 8 was the same as Comp. Ex. 7, except that the ZrP incorporation process was omitted.

Comparative Examples 9 & 10

Nafion® resin and dispersion were made as in Example 1, however the fluorination step was omitted and the EW was 920. A membrane reinforced with expanded PTFE was made by casting the dispersion onto a sheet of expanded PTFE to give a reinforced membrane of 20 μm thickness. For Comp. Ex 9, ZrP was incorporated into the membrane in similar manner to Ex 1, however the swelling/purification step was boiling in 3% hydrogen peroxide (instead of 1%) for 5 min, the Zr was incorporated by soaking in 2 M ZrOCl$_2$ without added HCl at 22° C. for 15 min, and the heating step after the first soak in phosphoric acid was in a convection oven at 130° C. for 10 min (instead of at 120° C. for 1 hr). The ZrP uptake was 12%. The membrane for Comp. Ex 10 was prepared in the same manner, except the ZrP incorporation process was omitted.

Table 1 below shows the results of decomposition results for the Examples above. The type of membrane indicates whether the membrane is low carboxyl (LC), low carboxyl with Zr (LC/Zr), high carboxyl (HC), or high carboxyl with Zr (HC/Zr). The wt uptake of ZrP is the increase in membrane weight after the incorporation of the zirconium phosphate as described above. The uptake of zirconium phosphate mgF/g memb is the mg of fluoride ion generated per gram of membrane dry weight in the third cycle of peroxide test. Hours/mgF/g is the number of hours required to generate 1 mg of fluoride per gram of ionomer in the third cycle of the peroxide test. This is calculated as:

hr/mg F/g ionomer=18 hr/[mg F/g memb×(100+wt uptake ZrP)/100].

This expresses the result as mg of fluoride generated per g of ionomer, rather than the mg of fluoride generated per g of membrane, recognizing that the composite membranes have a lower content of ionomer than the membranes without inorganic. The higher the number of hours required to generate 1 mg fluoride, the greater is the resistance of the membrane to degradation.

Table 2 shows the improvement in degradation after the low carboxyl and ZrP treatment. It can be seen that the combination of the two treatments leads to a greater than expected improvement in degradation rate.

TABLE 1

Degradation Data

| Membrane | Type | ZrP uptake wt % | mg F/g memb | Hours/mg F/g |
|---|---|---|---|---|
| Example 1 | LC/Zr | 11 | 0.50 | 32.6 |
| Example 2 | LC/Zr | 12 | 0.40 | 40.0 |
| Comp. Ex. 1 | LC | 0 | 0.81 | 22.1 |
| Comp. Ex. 2 | LC | 0 | 0.79 | 22.7 |
| Comp. Ex. 3 | HC/Zr | 18 | 2.17 | 7.0 |
| Comp. Ex. 5 | HC/Zr | 17 | 1.72 | 9.0 |
| Comp. Ex. 7 | HC/Zr | 15 | 2.06 | 7.6 |
| Comp. Ex. 9 | HC/Zr | 12 | 15.76 | 1.0 |
| Comp. Ex. 4 | HC | 0 | 4.21 | 4.3 |
| Comp. Ex. 6 | HC | 0 | 3.43 | 5.2 |
| Comp. Ex. 8 | HC | 0 | 8.99 | 2.0 |
| Comp. Ex. 10 | HC | 0 | 12.70 | 1.4 |

TABLE 2

Improvement by treatment

| Membrane | Avg. | Improvement over HC (Hours) |
|---|---|---|
| HC | 3.2 | — |
| HC/Zr | 6.2 | 3.0 |
| LC | 22.4 | 19.2 |
| LC/Zr | 36.3 | 33.1 |

What is claimed is:

1. A composition comprising a chemically stabilized, fluorinated ionomer having an inorganic filler incorporated therein, wherein the inorganic filler is a metal oxide, metal hydroxide, metal phosphate, or mixture thereof, and wherein the ionomer has been fluorinated by subjecting it to a fluorinating agent until the ionomer contains less than 200 unstable groups per 1,000,000 carbon atoms, wherein fluoride ion release in a third cycle of a Fenton Test using an acid form of the composition is in the range of 0.4 to 0.5 mgF/g of a membrane incorporating the composition, wherein in each cycle of a Fenton Test 0.6 g of dried composition is soaked in a glass tube containing 0.0029 g of FeSO$_4$.7H$_2$O dissolved in 50 ml of 30% hydrogen peroxide and heated at 85° C. for 18 hours.

2. The composition of claim 1 that contains less than 70 unstable groups per 1,000,000 carbon atoms.

3. The composition of claim 1 wherein the inorganic filler is present at about 1% to about 40% by weight, based on the total weight of the ionomer after incorporation.

4. The composition of claim 3 wherein the inorganic filler is present at about 3% to about 20% by weight, based on the total weight of the ionomer after incorporation.

5. The composition of claim 1 wherein the metal in the metal oxide, metal hydroxide, metal phosphate is titanium, zirconium, or hafnium, or mixture thereof.

6. The composition of claim 1 wherein the inorganic filler is a zirconium phosphate.

7. The composition of claim 1 wherein the fluorinated ionomer comprises a highly fluorinated carbon backbone and a side chain represented by the formula: —(O—CF$_2$CFR$_f$)$_a$—(O—CF$_2$)$_c$—(CFR'$_f$)$_b$SO$_3$M wherein R$_f$ and R'$_f$ are independently selected from F, Cl or a perfluorinated alkyl group having 1 to 10 carbon atoms, a=0 to 2, b=0 to 1, c=0 to 6, and M is hydrogen or one or more univalent cations.

8. A membrane comprising the composition of claim 1.

9. An electrochemical cell comprising the membrane of claim 8.

10. An electrode for use in an electrochemical cell comprising the composition of claim 1.

11. An electrochemical cell comprising the ionomer of claim 1.

12. The electrochemical cell of claim 11 that is a fuel cell.

13. A membrane comprising a porous support having interconnecting pores, a chemically stabilized fluorinated ionomer, and an inorganic filler, wherein:
- the inorganic filler is from the group of metal oxides, metal hydroxides, metal phosphates, and mixtures thereof;
- the ionomer has been chemically stabilized by subjecting it to a fluorinating agent until it contains less than 200 unstable groups per 1,000,000 carbon atoms; and
- the inorganic filler is distributed throughout the ionomer forming a composition, and the composition is distributed throughout the pores of the porous support,
- wherein fluoride ion release in a third cycle of a Fenton Test of an acid form of the composition is in the range of 0.4 to 0.5 mgF/g of the membrane incorporating the composition.

14. The membrane of claim 13 wherein the porous support is microporous PTFE in expanded or fibrillar form.

15. The membrane of claim 13 wherein the ionomer and inorganic filler substantially fill the pores of the porous support.

16. An electrochemical cell comprising the membrane of claim 13.

* * * * *